United States Patent [19]

Smith

[11] 3,766,049

[45] Oct. 16, 1973

[54] RECOVERY OF METAL FROM RINSE SOLUTIONS

[75] Inventor: Jack D. Smith, Boston, Mass.

[73] Assignee: Process Research Incorporated, Cambridge, Mass.

[22] Filed: Aug. 26, 1971

[21] Appl. No.: 175,132

[52] U.S. Cl............................. 204/301, 204/180 P
[51] Int. Cl............................................ B01d 13/02
[58] Field of Search ........................ 204/180 P, 301

[56] References Cited
UNITED STATES PATENTS

| | | | |
|---|---|---|---|
| 2,987,472 | 6/1961 | Kollsman | 204/301 X |
| 3,135,673 | 6/1964 | Tirrell et al. | 204/301 X |
| 3,309,301 | 3/1967 | Kollsman | 204/301 X |
| 3,433,726 | 3/1969 | Parsi et al. | 204/301 X |
| 3,481,851 | 12/1969 | Lancy | 204/301 X |
| 3,488,276 | 1/1970 | Tarsey | 204/301 |
| 3,577,331 | 5/1971 | Lacey et al. | 204/301 X |

Primary Examiner—John H. Mack
Assistant Examiner—A. C. Prescott
Attorney—Cesari & McKenna

[57] ABSTRACT

A method of recovering valuable metals from rinse baths associated with electroplating processes. The recovery utilizes electrodialysis to concentrate the metal to a sufficiently high concentration that convenient recovery of the metal, e.g., nickel or copper, can be completed by handling the metal as an ion in a liquid phase and without the need to plate the metal out on an electrode or precipitate it in any solid form.

2 Claims, 2 Drawing Figures

Patented Oct. 16, 1973 3,766,049

RECOVERY OF METAL FROM RINSE SOLUTIONS

BACKGROUND OF THE INVENTION

It has long been a problem to effect a convenient and economic recovery of valuable metals from the rinse waters required by electroplating processes. In recent years, publicity allegations relating to the toxic effect of many metallic contaminants have resulted in a further reason for removing such contaminants from waste waters before they are discharged into streams, or other disposal systems, from processing plants.

Historically, recovery of such metals has been economically marginal. This has been, in part, because recovery procedures have required that the metal be handled in some solid phase before it could be recycled to the electroplating process. For example, in U.S. Pat. No. 3,431,187 to Lancy, a process for gold recovery is disclosed which involved the removal of the gold on a cathode. In U.S. Pat. No. 3,481,851 to Lancy, a process for gold recovery is disclosed which involved the removal of the gold on a cathode. In U.S. Pat. No. 3,481,851 Lancy discloses use of an electrodialysis technique for effecting initial removal of some heavy metal ions from a chromic-acid-containing, metal-treating solution. The concentration of the metals removed is relatively low and Lancy teaches their recovery, from the catholyte solution, in the form of a powder. Chromium, the metal which is to be recycled is not carried through the electrodialysis membrane but is maintained in association with the anolyte for recycle to the treating bath.

There are a number of other processes wherein metal values are sought to be recovered. One of these is the treatment of pickle liquor disclosed by Calmon and Heit in U.S. Pat. No. 3,394,068 wherein ion-exchange membranes are utilized to provide a reaction zone wherein hydroxyl ions and iron cations react to form an iron hydroxide precipitate. Another such process is that taught by Radimer in U.S. Pat. No. 3,470,044 wherein Radimer succeeds in recycling a persulfate etchant to his primary processing operation, but recovers a metallic by-product by the usual electroplating technique.

None of these processes, relying as they do on solid-phase recovery of metal values, have provided an entirely suitable process for recovering metal from very dilute wash or rinse waters.

SUMMARY OF THE INVENTION

Therefore, it is a primary object of the invention to provide an improved process for recovering metal values from dilute solutions of the metal.

It is a particular object of the invention to provide a process whereby the metal values of the dilute concentration will be concentrated by at least 50 to 100 times, thereby providing a directly useful concentration of metal values for recycle to an electroplating operation.

Another object of the invention is to provide a process which can treat a relatively large quantity of solution without the requirement of handling a large quantity of treated solution.

A further object of the invention is to provide a process whereby metal is recovered in a liquid carrying phase thereby avoiding the necessity of handling the metal in any solid form.

Still another object of the invention is to provide means to maintain a rinse tank in an electroplating system at an optimum rinse concentration suitable for effective rinsing.

Another object of the invention is to provide an improved apparatus for the economic cleaning of metal-bearing ions from waste solutions in a way which provides for a minimum volume of residual liquid and allows a processor to more easily avoid problems associated with suitable disposal of heavy metal contaminants.

Other objects of the invention will be obvious to those skilled in the art on reading the instant application.

The above objects have been substantially achieved by providing a process whereby a relatively metal-rich rinse bath is passed through an electrodialysis step wherein the metal ion is concentrated at least about 50 to 100 times and then returned in liquid medium to the electroplating process. The cleaned rinse solution may be recirculated to the rinse bath.

The process of the invention is carried out at moderate temperatures and is characterized by severely limiting the volume of the metal-rich stream leaving the electrodialysis process. The temperatures at which the process may be carried out are moderate, typically from 20° to 30°C. Temperatures to 60°C or higher are also possible, the primary limiation being the effect of temperature on the physical and chemical characteristics of the membrane. It is to be noted that the process, surprisingly, can be operated with the concentrated metal stream comprising concentrations of ions that might be expected to produce precipitates but, for some reason, do not tend to do so under normal processing conditions.

The process is suitable for use in concentrating metal bearing ions which are cations or which are anions, e.g., $Zn\,(CN)_4^=$ or $Ag\,(CN)_2^-$ or $Ag^{15}$.

Among the commercially available membranes that may be used are those sold under the trade designation Neosepta CL-25T and Neosepta AV-4T by Tokuyama Soda Co. These membranes are (a) strongly acidic, cation-permeable and (b) strongly basic, anion-permeable, respectively. The former is characterized by an exchange capacity of 1.5 to 1.8 milliequivalents per gram of dry membrane (in sodium form). The latter is characterized by an exchange capacity of 1.5 to 2.0 milliequivalents per gram of dry membrane (in the chloride form). The cation-permeable membrane has an electrical resistance of 2.7 to 3.2 ohm-cm². The anion-permeable membrane has an electrical resistance of from 3.0 to 4.0 ohm-cm². These resistance measurements were made with the membrane equilibrated with 0.5 sodium chloride at 25°C.

An important aspect of the invention is the discovery that, even with no hydraulic flow being provided through the concentrating cells of the electrodialysis system, the inherent electroendosmotic permeability of related membranes can provide all the liquid necessary to achieve a metal-bearing steam suitably concentrated for flow back to an electroplating operation. Very little, if any, hydraulic water transport takes place across the membrane because of the relatively small pressure drop, usually less than 20 psig, which is associated with pumping of liquid through the diluting cells and because of the inherent low porosity of ordinary electrodialysis membranes. Such membranes will usually have an electroendosmotic permeability of less than about 10 ml. of water per amp-hour, preferably less than about 5 ml. of water per amp-hour.

ILLUSTRATIVE EMBODIMENT OF THE INVENTION

In order to point out more fully the nature of the present invention, the following working examples are given as illustrative embodiments of the present process and products produced thereby.

Figure 1:
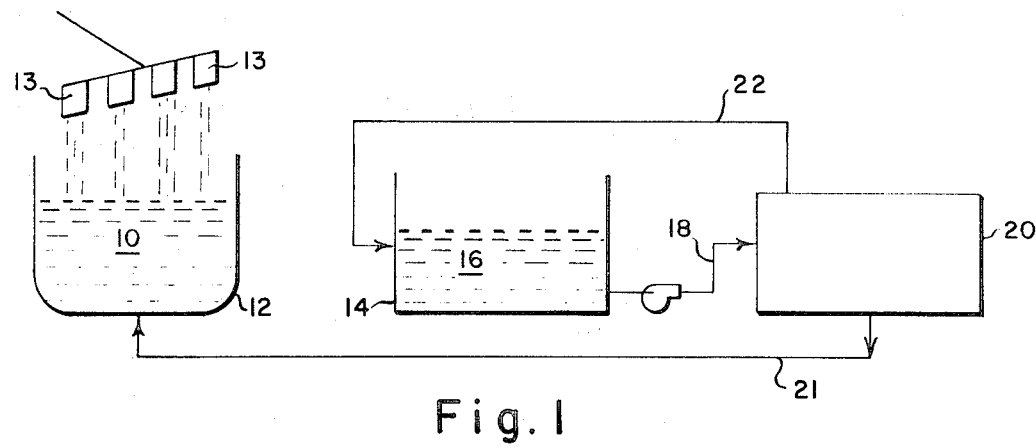
FIG. 1 shows a diagrammatic flow sheet illustrative of the process and apparatus of the invention.

Referring to FIG. 1, it is seen that a plating solution 10 is held in electroplating tank 12. As electroplated items 13 are removed from tank 12 and dipped into rinse tank 14, the metal ion concentration of solution 16 in rinse tank 14 is increased to about one per cent of the concentration in tank 12.

This relatively dilute solution 16 is pumped under pressure through feed pipe 18 to an electrodialysis unit 20. In unit 20, the ionic concentration of the solution is markedly reduced and it is fed back to rinse tank 14 via conduit 22. The ions removed from the rinse solution, now concentrated by 50 to 100 times or more, are returned to the electroplating tank 12 via conduit 21.

Depending on the particular electroplating system being serviced, it may be desirable to adjust the electroplating both with respect to any component of the bath which, unlike the metal-bearing ion, is not selectively concentrated for recycle.

Figure 2:
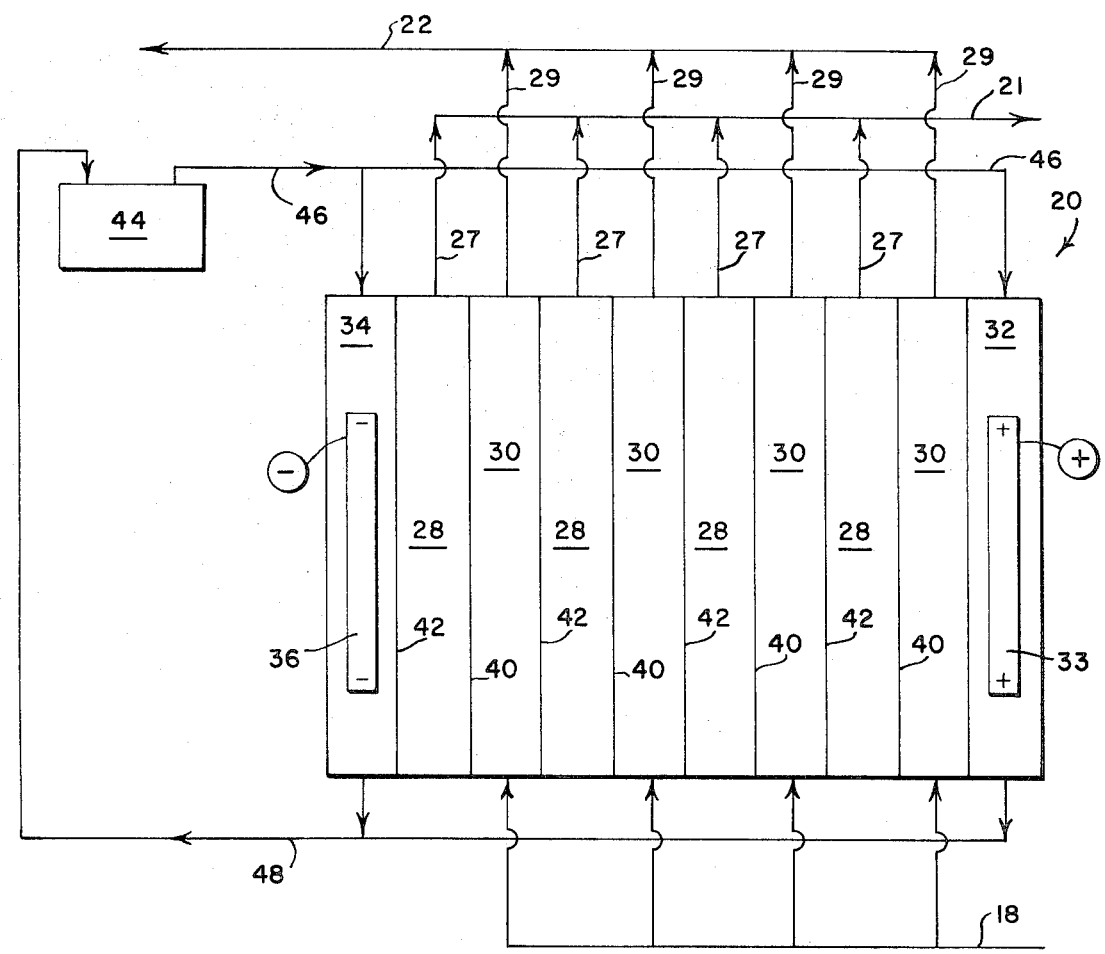
FIG. 2 is a diagrammatic flow sheet through the electrodialysis unit operated in conjunction with the process of the invention.

Referring to FIG. 2, it is seen that electrodialysis unit 20 comprises a multicell arrangement of concentrating compartments 28 and diluting compartments 30 separated by ion-exchange membranes and formed by flow-directing spacer/gaskets. Use of spacers is known in the art. They are not shown in FIG. 2. At one end of unit 20 is an anode cell 32 containing a platinum-coated anode 33. At the opposite end of unit 20 is cathode cell 34 containing a stainless steel cathode 36.

Assuming a feed solution containing both cations and anions is fed into diluting compartments 30, the anions will be attracted towards the anode 33 and, consequently, through a anion-permeable membrane 42 into a concentrating compartment 28 Simultaneously, a cation will be attracted towards the cathode 36, through a cation-permeable membrane 40, into a concentrating compartment 28. Flow is returned to the electroplating process from concentrating compartments 28 via conduits 27 and 21 and to rinse tank from diluting compartments 30 via conduits 29 and 22.

In the process of the invention, it is often desirable to recirculate a fluid solution, e.g., an aqueous solution of 0.01M sodium sulfate, through the electrode compartments. Thus a sodium sulfate flush solution is circulated through conduit 46, compartments 32 and 34, thence to a holding tank 44 and back to unit 20 through conduit 48.

The following two working examples illustrate the use of the process of the invention and the above-described operation to effect a concentration of copper and nickel respectively.

Working Example 1

A quantity of 300 milliliters per minute of an acidic aqueous solution, 0.037N in copper ion, was passed into the diluting compartments. This flow resulted in an average velocity of 17.0 cm per second along the dilute face of the membranes.

The electrode-containing compartments were "washed" with a 0.01 molar sodium sulfate solution. The voltage across the electrodes was set to provide a current density of 8 milliamps per square centimeter at a voltage of 0.3 volts per cell pair. The membranes were supported with 0.025-inch thick spacers which allowed an effective membrane surface area of 51 square centimeters and were configured to provide a flow path resulting in the aforesaid velocity of solution in the diluting compartments.

The concentrated stream, i.e., the output of the concentrating cells reached an equilibrium of about (0.1) ml per minute. This concentrate contained 3.18 equivalents of copper per liter. This represents a copper-concentration factor of about 85.

No crystallization of salts was experienced in the concentrated solution during operation. However, a precipitate often appears in the concentrated solution several hours after the operation is shut down.

Equilibrium conditions reached during the run were as follows:

| | Copper (equivalents/liter) |
|---|---|
| Feed In | $3.72 \times 10^{-2}$ |
| Feed Out | $3.33 \times 10^{-2}$ |
| Concentrate Out | 3.18 |

WORKING EXAMPLE 2

The same operation and procedure is utilized as is set forth in Working Example 1.

A standard electroplating solution was diluted 100 times to provide a feed solution having 0.6 to 0.7 grams per liter of nickel ion. A quantity of dilute feed solution was recycled which assured a relatively small drop in nickel ion concentration during the run, i.e., the concentration in the diluting compartments averaged about 0.645 grams of nickel ion per liter.

The concentrate solution was accumulated in the concentrating cells. No solution was pumped into the concentrating cells during the electrodialysis operation. The fluid concentrate output at equilibrium was entirely caused by permeation of the membranes bounding the concentrating compartments by entrained electroendosmotic waters accompanying the moving ions. This condition is described herein as one substantially free of hydraulic flow.

A separate solution of 0.01 molar sodium sulfate, hydraulically isolated from the rest of the system, was recycled through the electrode compartments, during the run, at a rate of 1,100 milliliters per minute.

The test was run with a 4-volt potential between cathode and anode. This allowed maintenance of a constant voltage of 0.3 volt per cell pair (transverse to the stack of membranes and spacers). The current was thereby maintained at 90 milliamperes.

The nickel solution to be "cleaned," i.e. the diluted standard electroplating solution, was pumped into the electrodialysis unit at the rate of 150 milliliters per minute. Concentrate liquid was formed at the rate of about 7 milliliters per hour and had a nickel ion concentration of 39.5 grams per liter. Thus the effective concentration of nickel from feed stream to concentrate stream is about 60-fold. The conditions described in this paragraph are the equilibrium conditions, substantially maintained for about 25 hour run.

It is also to be understood that the following claims are intended to cover all of the generic and specific features of the invention herein described and all statements of the scope of the invention which might be said to fall therebetween.

What is claimed is:

1. In an electroplating system comprising (a) an electroplating bath, (b) a rinse tank for rinsing articles which have been electroplated, and (c) an electrodialysis apparatus forming means to treat liquid from said rinse tank, the improvement wherein said electrodialysis unit comprises concentrating cells formed of a cation-permeable membrane and an anion-permeable membrane, each said membrane having an electroendosmotic water transfer value of less than about 10 ml of water per amp-hour, wherein the sole source of fluid into said concentrating cells of said electrodialysis apparatus is through said ion exchange membranes, and wherein there is independent means for removing fluid from said cells.

2. A system as defined in claim 1 wherein said membranes have an electroendosmotic water transfer of less than about 5 milliliters of water per amp-hour.

* * * * *